United States Patent
Barnhill

(10) Patent No.: US 8,014,741 B2
(45) Date of Patent: Sep. 6, 2011

(54) SIGNAL QUALITY ESTIMATION AND CONTROL SYSTEM

(75) Inventor: Matthew S Barnhill, Duluth, GA (US)

(73) Assignee: THAT Corporation, Milford, MA (US)

( * ) Notice: Subject to any disclaimer, the term of this patent is extended or adjusted under 35 U.S.C. 154(b) by 1227 days.

(21) Appl. No.: 11/395,990

(22) Filed: Mar. 31, 2006

(65) Prior Publication Data
US 2006/0229751 A1    Oct. 12, 2006

Related U.S. Application Data

(60) Provisional application No. 60/667,969, filed on Apr. 4, 2005.

(51) Int. Cl.
*H04B 17/00* (2006.01)
*H04B 1/10* (2006.01)

(52) U.S. Cl. ............ 455/226.1; 455/226.3; 455/221; 455/222; 455/254

(58) Field of Classification Search ............. 455/226.1, 455/226.2, 226.3, 226.4, 229, 218, 221, 254
See application file for complete search history.

(56) References Cited

U.S. PATENT DOCUMENTS

| | | | | |
|---|---|---|---|---|
| 3,387,222 A | * | 6/1968 | Beetle, Jr. et al. | 327/68 |
| 3,605,018 A | * | 9/1971 | Coviello | 375/349 |
| 3,889,192 A | * | 6/1975 | Schiebelhuth et al. | 455/211 |
| 4,121,254 A | * | 10/1978 | Morita et al. | 455/192.3 |
| 4,561,114 A | * | 12/1985 | Kozono et al. | 455/226.4 |
| 4,619,002 A | * | 10/1986 | Thro | 455/226.2 |
| 4,680,793 A | * | 7/1987 | Sugai et al. | 381/13 |
| 4,703,501 A | * | 10/1987 | Sugai et al. | 381/10 |
| 4,756,023 A | * | 7/1988 | Kojima | 455/134 |
| 5,073,976 A | * | 12/1991 | Kennedy | 455/161.3 |
| 5,214,708 A | | 5/1993 | McEachern | 381/48 |
| 5,319,453 A | | 6/1994 | Copriviza et al. | 348/6 |
| 5,613,232 A | * | 3/1997 | Toshida et al. | 455/226.4 |
| 5,808,671 A | | 9/1998 | Maycock et al. | 348/180 |
| 5,842,119 A | | 11/1998 | Emerson et al. | 455/161.3 |
| 5,950,139 A | * | 9/1999 | Korycan | 455/566 |
| 6,055,318 A | | 4/2000 | Whitecar | 381/94.2 |

(Continued)

FOREIGN PATENT DOCUMENTS
WO    WO 01/58162    8/2001

*Primary Examiner* — Duc M Nguyen
(74) *Attorney, Agent, or Firm* — McDermott Will & Emery LLP

(57) ABSTRACT

A signal quality estimation and control system for controlling a signal having noise. The system may include a signal strength determination system having an input configured to receive the signal and an output configured to output information indicative of the strength of the signal, a noise strength determination system having an input configured to receive the signal and an output configured to output information indicative of the strength of the noise in the signal, and a signal quality evaluation system. The signal quality evaluation system may have an input configured to receive the output of the signal strength determination system, an input configured to receive the output from the noise strength determination system, and an output configured to output information indicative of the quality of the signal based on the output from the signal strength determination system and the output from the noise strength determination system. A signal control system may be include that has an input configured to receive the output from the signal quality evaluation system and to control a switching function relating to the signal based on the output from the signal quality evaluation system.

15 Claims, 4 Drawing Sheets

U.S. PATENT DOCUMENTS

| | | | |
|---|---|---|---|
| 6,324,382 B1 | 11/2001 | Dolder | 455/63 |
| 6,434,622 B1 | 8/2002 | Monteiro et al. | 709/231 |
| 6,816,003 B2 | 11/2004 | Krishnapura et al. | 327/552 |
| 6,927,802 B2 * | 8/2005 | Kellner et al. | 348/485 |
| 7,076,274 B2 * | 7/2006 | Jollota et al. | 455/561 |
| 2003/0098926 A1 | 5/2003 | Jamie et al. | |
| 2003/0228857 A1 * | 12/2003 | Maeki | 455/278.1 |
| 2004/0180677 A1 * | 9/2004 | Harris et al. | 455/466 |

* cited by examiner

SIGNAL QUALITY ESTIMATION AND CONTROL SYSTEM

CROSS-REFERENCE TO RELATED APPLICATION

This application is based upon and claims priority to U.S. Provisional Application Ser. No. 60/667,969, entitled "FM Signal Quality Estimation for BTSC Audio Decoders," filed Apr. 4, 2005, the entire content of which is incorporated herein by reference.

BACKGROUND

This application relates to signal processing and control systems and, more particularly, to the estimation of signal strength and/or noise in a modulated signal and to the control of that signal.

DESCRIPTION OF RELATED ART

Noise in a modulated signal, as well as weakness in its strength, can be problematic. However, it may be difficult to accurately assess the level of that noise. It may also be difficult to effectively address any problems that are detected.

Noise and weakness in the Secondary Audio Programming (SAP) channel of a BTSC television signal is an example. As is well known, the SAP channel is frequency modulated on a 4.5 MHz audio carrier that is itself frequency modulated as part of the complete television signal. This same audio carrier is also often used to carry other channels of information, including the sum of the left and right stereo signals (L+R), the difference between the left and right stereo signals (L−R), and professional information (PROF).

The SAP channel is usually more susceptible to noise than the L+R and L−R (which are typically decoded in the television to form the left and right stereo signals). This phenomenon is attributable to the fact that the SAP channel is further away from the center of the 4.5 MHz carrier than either the L−R channel or the L+R channel (which is also used for the monaural signal). As is well known, signals that are further away from the center of a frequency modulated carrier are usually more susceptible to noise interference than signals that are closer to the center of that carrier.

In some cases, the SAP signal may not be present or may be of insufficient signal strength for acceptable listening quality. In other cases, the noise imposed on the SAP signal may be of such amplitude that it degrades the SAP signal to the point where it is unacceptable.

Similar and/or additional problems may be created in connection with amplitude and/or noise in other types of modulated signals, such as in a professional channel FM carrier signal (PROF), a European dual FM audio carrier signal (A2 and Zweiton), a Japanese 4.5 MHz audio carrier signal (EIAJ), a Japanese FM difference carrier signal (EIAJ), an analog mono FM carrier signal (NICAM), an FM stereo signal, a satellite FM audio signal, and an AM signal.

SUMMARY

An SAP signal quality estimation and control system for controlling an SAP signal having noise may include a signal quality estimation system having an input configured to receive the SAP signal and an output configured to output information indicative of the quality of the received signal. The system may also include a signal control system having an input configured to receive the output from the signal quality estimation system and to provide a switching function relating to the SAP signal.

The signal control system may be configured to control switching between an SAP channel and stereo channels, between an SAP channel and a monaural channel, between enabling and disabling selection of an SAP channel by a user, and/or between playing and muting an SAP channel.

The SAP signal quality estimation system may be implemented with a digital signal processing system.

A signal quality estimation and control system may include a signal strength determination system having an input configured to receive the signal and an output configured to output information indicative of the strength of the signal, a noise strength determination system having an input configured to receive the signal and an output configured to output information indicative of the strength of the noise in the signal, and a signal quality evaluation system. The signal quality evaluation system may have an input configured to receive the output of the signal strength determination system, an input configured to receive the output from the noise strength determination system, and an output configured to output information indicative of the quality of the signal based on the output from the signal strength determination system and the output from the noise strength determination system.

The output of the signal quality evaluation system may be configured to output information indicative of whether the signal quality is acceptable or not acceptable. This may be based on a comparison between the output information from the signal strength determination system and a predetermined signal strength threshold. This may in addition or instead be based on a comparison between the output information from the noise strength determination system and a predetermined noise strength maximum. It may in addition or instead be based on a comparison between the output information from the signal strength determination system and the output information from the noise strength determination system. The comparison may be between a ratio of the output information from the signal strength determination system to the output information from the noise strength determination system and a predetermined signal-to-noise ratio threshold.

The signal strength determination system may include an envelope extraction system having an input configured to receive an FM signal and an output configured to output information indicative of the magnitude of the envelope of the FM signal. The system may also have an averaging system having an input configured to receive the output from the envelope extraction system and an output configured to output information indicative of an average of the output from the envelope extraction system.

The signal strength determination system may include a signal strength indicator having an input configured to receive information based on the output from the averaging system and an indicator configured to indicate the strength of the signal to a user.

A noise strength determination system may include an envelope extraction system having an input configured to receive an FM signal and an output configured to output information indicative of the magnitude of the envelope of the FM signal. It may also have a first averaging system having an input configured to receive the output from the envelope extraction system and an output configured to output information indicative of an average of the output from the envelope extraction system. It may also have a subtracting system having an input configured to receive the output from the envelope extraction system, an input configured to receive the output from the averaging system, and an output configured to output information indicative of the difference between the output from the envelope extraction system and the output from the first averaging system. It may also have a second averaging system having an input configured to receive information that is based on the output from the subtracting system and an output configured to output information indicative of an average of the information that is based on the output from the subtracting system.

The first and/or second averaging systems may each include an integrator.

The noise strength determination system may include a squaring system having an input configured to receive the output from the subtracting system and an output configured to deliver information indicative of approximately the square of the output from the subtracting system to the input of the second averaging system.

The noise strength determination system may include a noise strength indicator having an input configured to receive information based on the output from the second averaging system and an indicator configured to indicate the strength of the noise to a user.

A noise strength determination system for determining the strength of noise in an AM signal having an envelope may include an extraction system having an input configured to receive the AM signal and an output configured to output information indicative of the magnitude of FM modulation on the AM signal.

These, as well as other components, steps, features, objects, benefits, and advantages, will now become clear from a review of the following detailed description of illustrative embodiments, the accompanying drawings, and the claims.

DETAILED DESCRIPTION OF ILLUSTRATIVE EMBODIMENTS

Figure 1:
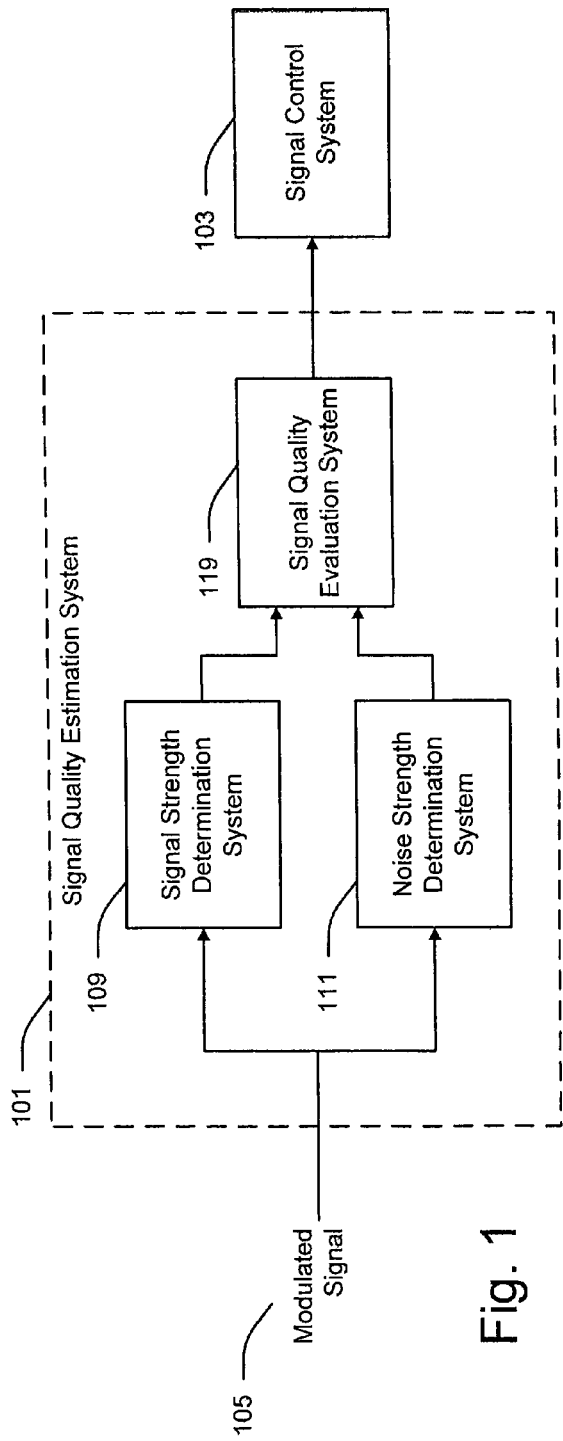
FIG. 1 is a block diagram of a signal quality estimation and control system.

FIG. 1 is a block diagram of a signal quality estimation and control system.

As shown in FIG. 1, the signal quality estimation and control system may include a signal quality estimation system 101 and a signal control system 103.

The signal quality estimation system 101 may be configured to receive a modulated signal 105 and to output information indicative of the quality of the modulated signal 105. The modulated signal 105 may be any type of modulated signal, including derivatives of modulated signals, such a modulated signals that have been shifted in frequency through heterodyning or other techniques. The modulated signal 105 may include one or more undesirable noise components. Specific examples of the modulated signal 105 are discussed below in connection with FIGS. 2-4.

The signal quality estimation system 101 may have a signal strength determination system 109 to which the modulated signal 105 may be delivered. The signal strength determination system 109 may output information indicative of the strength of the modulated signal 105.

The signal quality estimation system 101 may have a noise strength determination system 111 to which the modulated signal 105 may be delivered. The noise strength determination system 111 may output information indicative of the strength of the noise that is part of the modulated signal 105.

The signal quality estimation system 101 may have a signal quality evaluation system 119. The signal quality evaluation system 119 may be configured to receive the output from the signal strength determination system 109 and from the noise strength determination system 111. The signal quality evaluation system 119 may output information to the signal control system 103 that is indicative of the quality of the modulated signal 105 based on the output from the signal strength determination system 109 and/or the output from the noise strength determination system 111.

The signal quality evaluation system 119 may implement any type of algorithm, computation or process to provide this output. In one embodiment, the signal quality evaluation system 119 may compare the output from the signal strength determination system 109 with a predetermined signal strength threshold. If the output from the signal strength determination system 109 exceeds this predetermined signal strength threshold, the signal quality evaluation system 119 may indicate to the signal control system 103 that the modulated signal 105 is acceptable. Otherwise, the signal quality evaluation system 119 may indicate that the modulated signal 105 is not acceptable.

The signal quality evaluation system 119 may instead compare the output from the noise strength determination system 111 with a predetermined noise strength maximum. If the output from the noise strength determination system 111 does not exceed this predetermined noise strength maximum, the signal quality evaluation system 119 may indicate to the signal control system 103 that the modulated signal 105 is acceptable. Otherwise, the signal quality evaluation system 119 may indicate that the modulated signal 105 is not acceptable.

The signal quality evaluation system 119 may instead compare the output from the signal strength determination system 109 with the output from the noise strength determination system 111 and communicate whether the modulated signal 105 is acceptable or not acceptable based on this comparison.

Any type of comparison may be made. In one embodiment, the comparison may be between a ratio of the output from the signal strength determination system 109 to the output from the noise strength determination system 111 and a predetermined signal-to-noise ratio threshold. If the measured ratio exceeds the predetermined threshold, the signal quality evaluation system 119 may indicate to the signal control system 103 that the modulated signal 105 is acceptable. Otherwise, it may indicate that it is unacceptable.

The signal quality evaluation system 119 may make the acceptable/not acceptable determination based on other criteria, as well as based on a combination of criteria. For example, the signal quality evaluation system 119 may only signal that the modulated signal 105 is acceptable if the output from the signal strength determination system 109 exceeds the predetermined signal strength threshold and the output from the noise strength determination system 111 does not exceed the predetermined noise strength maximum. In a still further embodiment, the signal quality evaluation system 119 may only signal that the modulated signal 105 is acceptable if the output from the signal strength determination system 109 exceeds the predetermined signal strength threshold and the ratio between the output from the signal strength determination system 109 to the output of the noise strength determination system 111 exceeds the predetermined signal-to-noise ratio threshold.

The signal control system 103 may be configured to receive the output from the signal quality estimation system 101 and to provide a switching function relating to the modulated signal 105. Any type of switching function that is related to the modulated signal 105 may be provided. Examples are discussed below in connection with the discussion of FIG. 3.

Figure 2:
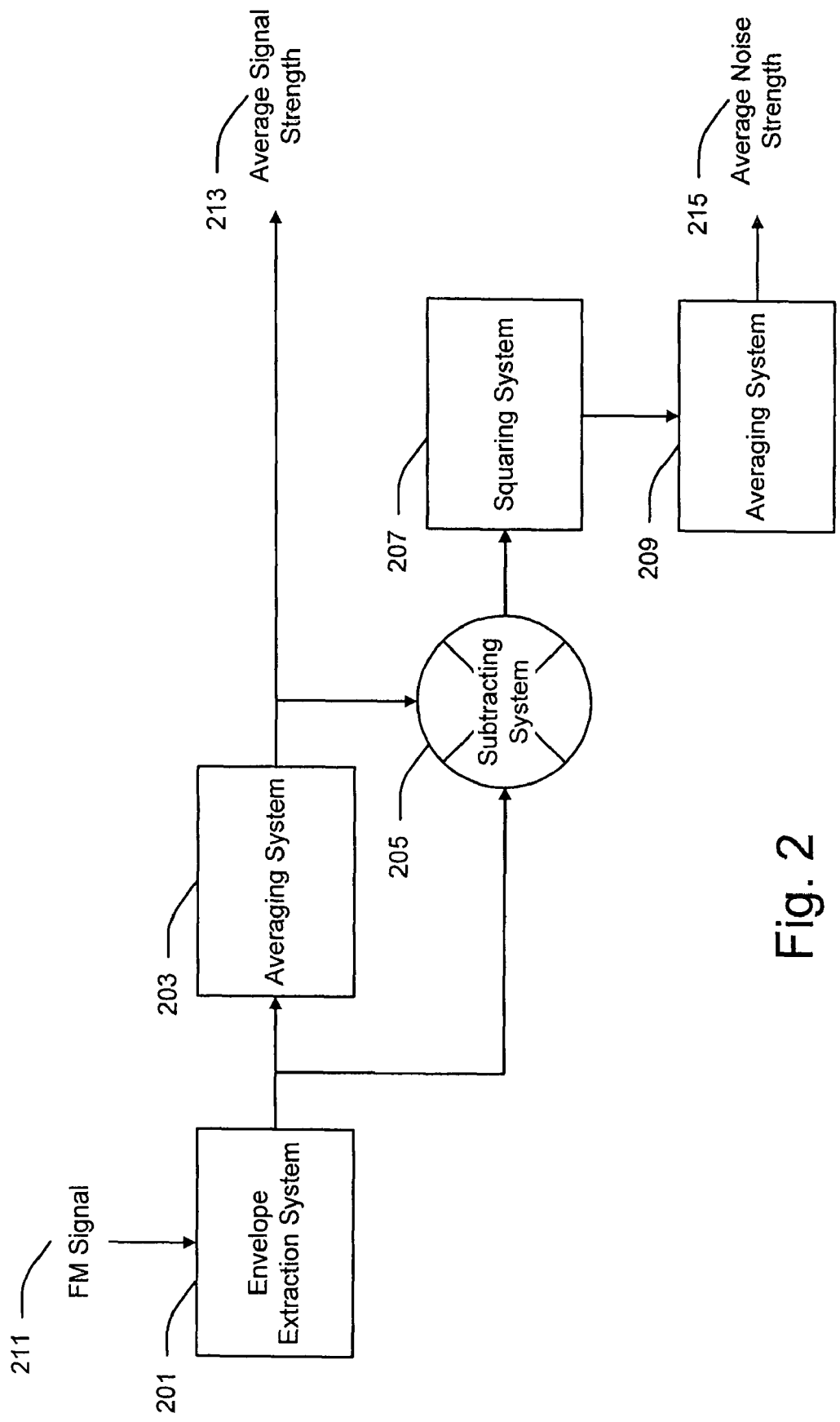
FIG. 2 is a block diagram of the signal and noise strength determination systems shown in FIG. 1, configured to operate with an FM signal.

FIG. 2 is a block diagram of the signal and noise strength determination systems shown in FIG. 1, configured to operate with an FM signal. Although FIG. 2 will now be discussed in conjunction with FIG. 1, the systems that are illustrated in FIG. 2 may be used with systems other than the system shown in FIG. 1. Similarly, the system shown in FIG. 1 may be implemented with systems other than those shown in FIG. 2.

The signal strength determination system 109 shown in FIG. 1 may include an envelope extraction system 201 and an averaging system 203.

The noise strength determination system 111 shown in FIG. 1 may include the envelope extraction system 201, the averaging system 203, a subtracting system 205, a squaring system 207 and an averaging system 209.

The envelope extraction system 201 may be configured to generate an output that represents the magnitude of a complex (analytic) representation of an FM signal 211, such as the envelope of the FM signal 211. Systems that extract envelope information from an FM signal are well known. Any such system may be used.

The averaging system 203 may be configured to generate an output that represents the magnitude of the envelope that is received from the envelope extraction system 201 over a period of time. Systems that average signal values over time are also well known and any such system may be used. Such a system may include, for example, a low pass filter and/or an integrator. The output from the averaging system 203 may be representative of the average signal strength of the FM signal 211, as reflected by an average signal strength output 213.

The subtracting system 205 may be configured to subtract the instantaneous value of the envelope from the envelope extraction system 201 from the output of the averaging system 203. The output of the subtracting system 205 may thus represent the instantaneous deviation of the envelope of the FM signal 211 from the average value of its envelope.

In an ideal system, the envelope of the FM signal 211 would not vary as a function of time. In a real system, however, noise may be introduced that causes amplitude modulations of the FM signal 211. The output of the subtracting system 205 may thus represent noise on the FM signal 211.

The squaring system 207 may be configured to receive the output from the subtracting system 205 and to output information indicative of approximately the square of the output from the subtracting system 205. Squaring the output from the subtracting system 205 may eliminate errors that might otherwise be introduced if both positive and negative variations in the output from the subtracting system 205 are evaluated. Squaring the output also provides a more linear representation of variations in the noise level in the FM signal 211. A system that computes the absolute value of the output from the subtracting system 205 may be used instead of the squaring system 207.

The averaging system 209 may be configured to average the output from the squaring system 207 over a period of time. It may be any type of averaging system, such as one of the types of averaging systems discussed above in connection with the averaging system 203.

The output of the averaging system 209 may thus represent the average noise strength, as reflected by an average noise strength output 215.

Figure 3:
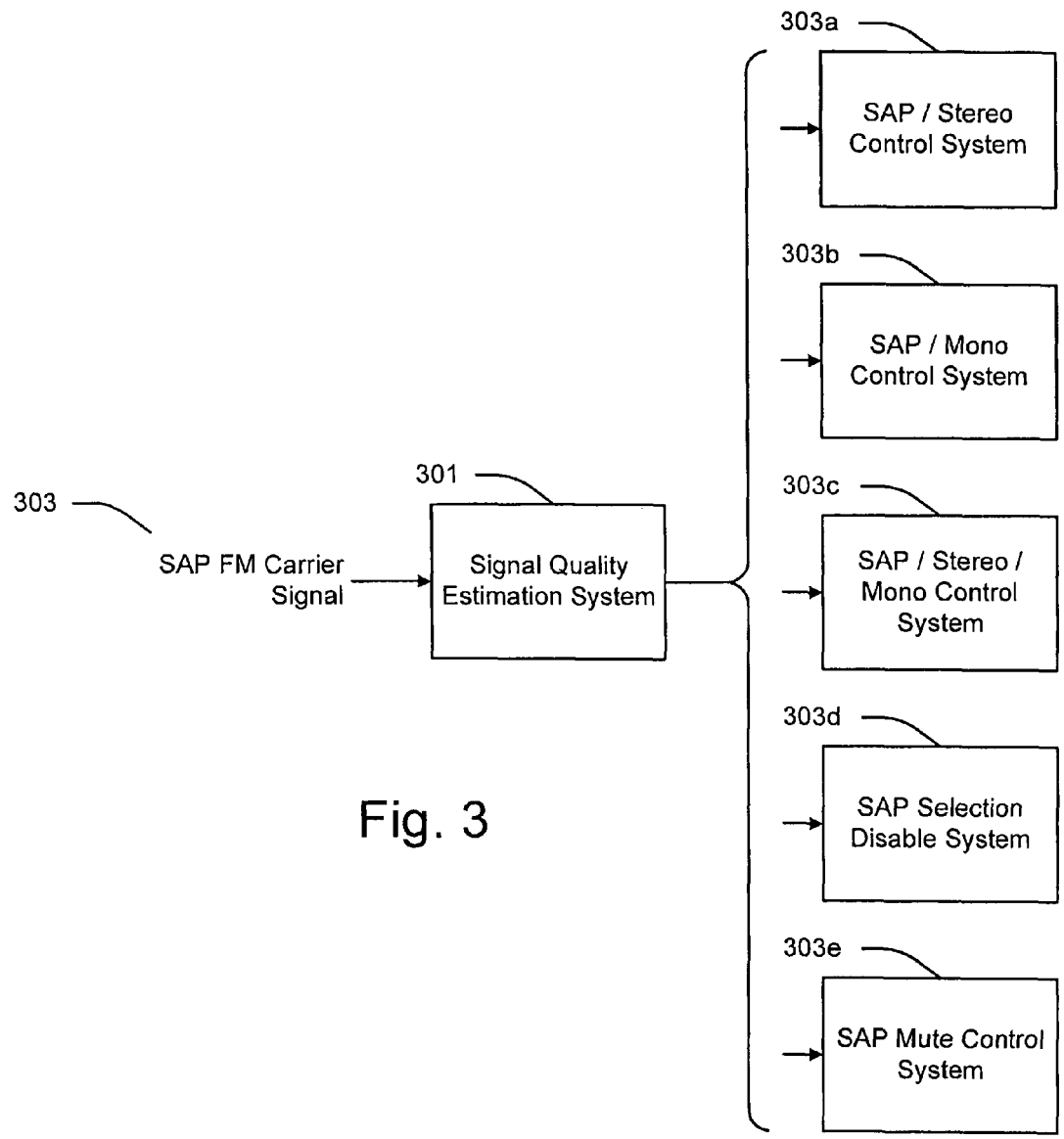
FIG. 3 is a block diagram of various signal quality estimation and control systems that process SAP FM carrier signals.

FIG. 3 is a block diagram of various signal quality estimation and control systems that process SAP FM carrier signals. It illustrates some of the many types of switching functions that may be provided by the signal control system 103 in FIG. 1.

As can be seen from an examination of FIG. 3, a signal quality estimation and control system 301 may receive an SAP FM carrier signal 303 which may be part of a BTSC formatted signal. Although an SAP FM carrier signal is illustrated in this figure as the signal that is being processed, any other type of modulated signal may be processed instead. Examples of such other types of modulated signals are discussed below in connection with FIG. 4.

Returning to FIG. 3, the SAP FM carrier signal 303 may be processed by the signal quality estimation system 301, which may be the same as the signal quality estimation system 101 shown in FIGS. 1 and 2.

Blocks 303a-303e illustrate a variety of different types of signal control system that may be used. Each may serve as the signal control system 103 illustrated in FIG. 1. The actual system may have only one of these types of control systems or, in some cases, another type or, in still other cases, a plurality of these types.

The SAP/stereo control system 303a may be configured to switch a receiver in which the system shown in FIG. 3 may be installed from outputting the SAP channel to outputting the stereo channels. The SAP/stereo control system 303a may be configured to cause this switch to occur when the output from the signal quality estimation system 301 indicates that the SAP FM carrier signal 303 is not of acceptable quality.

Through the use of this configuration, a receiver may automatically switch from the SAP channel to the normal stereo channels when the noise level and/or signal strength in the SAP FM carrier signal 303 reaches an unacceptable level. This may automatically present to the listener comparable channels of superior quality, as the stereo channels are usually less sensitive to noise than the SAP channel. The SAP/stereo control system 303a may be configured to cause the receiver to revert back to the originally-selected SAP channel when the output from the signal quality estimation system 301 indicates that the SAP FM carrier signal 303 is back to acceptable quality.

The SAP/mono control system 303b may operate in a similar manner, except that it may cause the receiver to switch between the SAP channel and the monaural channel. The monaural channel is likely to be even more immune to noise than the stereo channels.

The SAP/stereo/mono control system 303c may operate in a similar manner, except that it may be configured to switch between three modes, namely the SAP channel, the stereo channels, and the monaural channel. In this embodiment, the signal quality and estimation system 301 may be configured to output three levels of acceptability, the highest level being interpreted by the SAP/stereo/mono control system 303c to allow the SAP channel to continue to be played, the middle level being interpreted by the SAP/stereo/mono control system 303c to require the receiver to switch from the SAP channel to the stereo channels, and the lowest level being interpreted by the SAP/stereo/mono control system 303c to require the receiver to switch from the stereo channels to the monaural channel. As the signal improves, the SAP/stereo/ mono control system 303c may be configured to cause the switching to revert to the original setting.

Many receivers contain a user-operated control that enables the user to switch between the normal stereo channels (or monaural channel) and the SAP channel. The SAP selection disable system 303d may be configured to disable this user-operated control when the output from the signal quality and estimation system 301 indicates that the quality of the SAP FM carrier signal 303 is unacceptable. It may do so by causing this option to be removed from the user's view or preventing it's actuation by the user. The disable control may be removed once the output from the signal quality and estimation system 301 indicates that the quality of the SAP FM carrier signal 303 is again acceptable.

The SAP mute control system 303e may be configured to mute the sound output from the receiver when the output from the signal quality estimation system 301 indicates that the quality of the SAP FM carrier signal 303 is unacceptable, and may remove this muting one an acceptable indication is again received.

Figure 4:
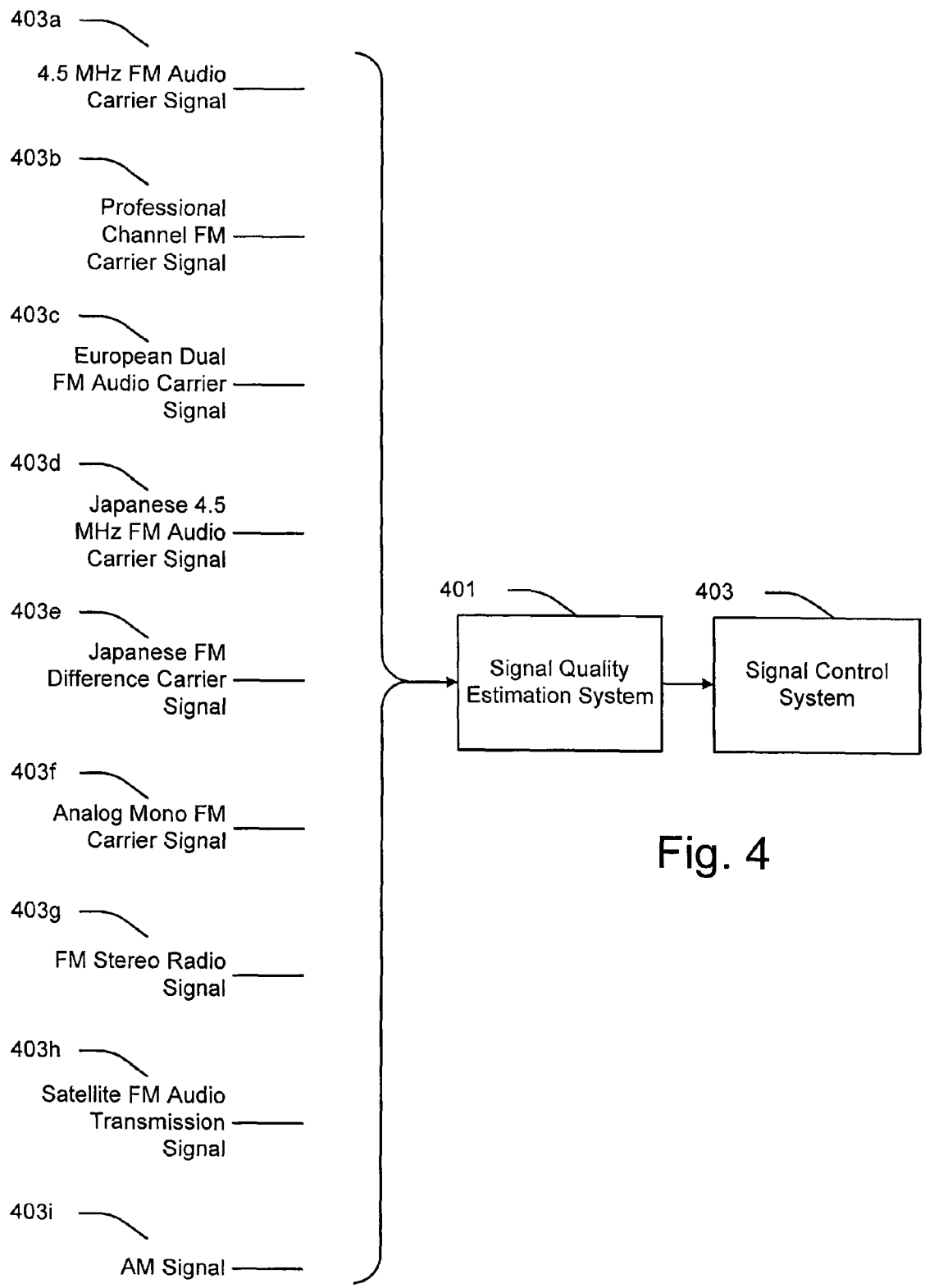
FIG. 4 is a block diagram of various signal quality estimation and control systems that process signals other than SAP FM carrier signals.

FIG. 4 is a block diagram of various signal quality estimation and control systems that process signals other than SAP FM carrier signals. As shown in FIG. 4, signal quality estimation and control systems may include a signal quality estimation system 401 that may be of any type, such as the signal quality estimation system 101 shown in FIGS. 1 and 2.

The signal quality estimation system 401 may be configured to receive any type of modulated signal, such as one of the modulated signals 403a-i.

A signal control system 403 may receive the output from the signal quality estimation system 401 and control a switching function that is related to the modulated signal. The signal control system 403 may be any the types 303a-303e that are discussed above in connection in FIG. 3, modified to control switching functions that are appropriate for the particular modulated signal that is being processed.

One example of a modulated signal that may be processed is the 4.5 MHz FM audio carrier signal 403a. As is well known, this is the audio carrier channel that is FM-modulated on the standard NTSC signal according to the BTSC format. It includes the SAP channel that has been discussed above, as well as other channels. In this embodiment, the signal control system 403 may be configured to switch between stereo and monaural or between monaural and mute Another example of a modulated signal that may be processed is the professional channel FM carrier signal 403b. As is well known, the professional channel FM carrier is another one of the channels that comprise the 4.5 MHz FM audio carrier in an NTSC signal. In this embodiment, the signal control system 403 may be configured to switch between the professional channel and mute.

Another example of a modulated signal that may be processed is the European dual FM audio carrier signal 403c. As is well known, this is an audio channel used in European television broadcasts as part of the A2 or Zweiton formats. In this embodiment, the signal control system 403 may be configured to switch between stereo and monaural, or between bilingual channel B and bilingual channel A or between any of these channels and mute.

Another example of a modulated signal that may be processed is the Japanese 4.5 MHz FM audio carrier signal 403d. As is well known, this is the audio carrier commonly used in Japan as part of the EIAJ format. In this embodiment, the signal control system 403 may be configured to switch between stereo and monaural or between monaural and mute.

Another example of a modulated signal that may be processed is the Japanese FM difference carrier signal 403e. As is well known, this difference carrier forms one of the channels on the Japanese 4.5 MHz FM carrier signal under the EIAJ format.

Another example of a modulated signal that may be processed is the analog mono FM carrier signal 403f. As is well known, this is the analog monaural channel under the NICAM format. In this embodiment, the signal control system 403 may be configured to switch between the monaural channel and mute.

Another example of a modulated signal that may be processed is the FM stereo radio signal 403g. As is well know, this is a signal that is commonly used in FM radio. In this embodiment, the signal control system 403 may be configured to switch between the stereo and monaural channels.

Another example of a modulated signal that may be processed is the satellite FM audio transmission signal 403h. As is well known, this is a signal commonly used in the transmission of FM audio by satellite. In this embodiment, the signal control system 403 may be configured to switch between the monaural channel and mute.

A still further example of a modulated signal that may be processed is the AM-modulated signal 403i. Such a signal may be used, for example, in connection with AM radio or as the analog mono carrier in the NICAM-L system. In this embodiment, however, the signal quality estimation system 401 may use an extraction system that is different from the envelope extraction system 201 that is shown in FIG. 2. In particular, the signal quality estimation system 401 may use an extraction system that is configured to receive the AM signal 403i and to output information indicative of the magnitude of FM modulation on the AM signal. In a perfect world, an AM signal would not display any deviation in its frequency. When noise is added to such a signal, however, the noise may be detected by examining deviations in the frequency of the AM signal, that is by examining the magnitude of FM on the AM signal. Except for this change, all of the other components shown in FIGS. 1 and 2 may be the same as have been described above. In this embodiment, the signal control system 403 may be configured to switch between the monaural channel and mute.

Figure 5:
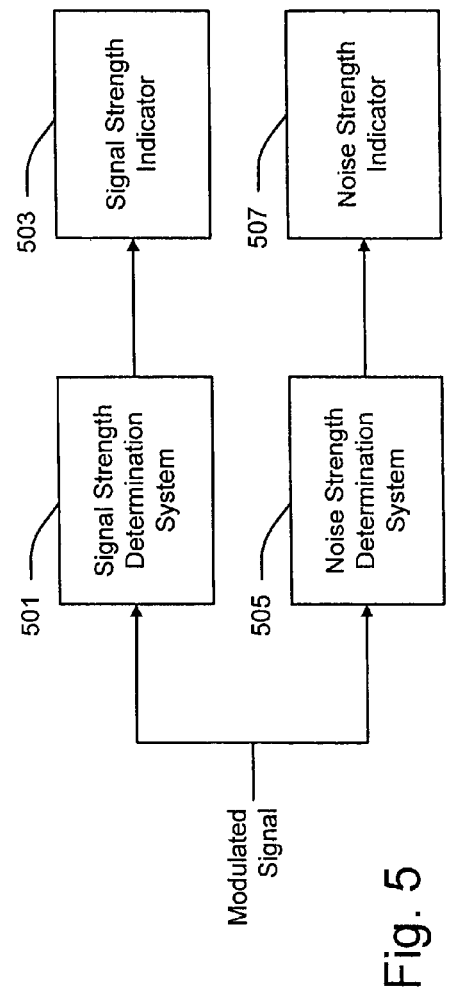
FIG. 5 is a block diagram of a signal and noise strength indicator system.

FIG. 5 is a block diagram of a signal and noise strength indicator system. It may include a signal strength determination system 501 that is coupled to a signal strength indicator 503. Similarly, it may include a noise strength determination system 505 that is coupled to a noise strength indicator 507.

The signal strength determination system 501 may be the same as the signal strength determination system 109, or may be of any other type. Similarly, the noise strength determination system 505 may be the same as the noise strength determination system 111, or may be of any other type.

The signal strength indicator 503 and the noise strength indicator 507 may be any type of indicator configured to communicate information about signal strength or noise strength, respectively, to a user. Each may include a digital display, one or more LED lights, an analog meter, any other type of indicating device, and/or any combination of these devices. Although the system shown in FIG. 5 is illustrated as having both a signal strength indicator 503 and a noise strength indicator 507, alternate embodiments may include only one of these indicators, such as only the signal strength indicator 503 (in which event the noise strength determination system 505 and the noise strength indicator 507 may not be needed) or the noise strength indicator 507 (in which event the signal strength determination system 501 and the signal strength indicator 503 may not be needed).

The composition and operation of the various subsystems that have been described above without elaboration are well known in the art. One or more of these subsystems may be implemented with analog circuitry and/or digital circuitry. For example, one or more of the components in the signal strength determination system 109, the noise strength determination system 111, and the signal quality evaluation system 119 may be implemented using mathematical equations that are processed in the digital domain with a digital signal processing system, all in accordance with well known technology. In this embodiment, as well as in other embodiments, each modulated input signal that has been described may, in fact, constitute periodic samplings of the referenced modulated signal. These samplings may be at any rate, such as at the rate of 384 KHz or 288 KHz.

The averaging systems that have been described may be configured in accordance with well known techniques to give more weight to recent measurements than to older measurements.

Although certain signals have thus-far been described as being FM or AM signals, these signals may include both types of modulation. The signal quality estimation and control systems that have been described may effectively process these mixed modulation-type signals, particularly when only one of the types of modulations predominate in the signal. When processing a signal with mixed types of modulation, but with one type predominating, for example, the signal quality evaluation system 119 may be configured not to find a signal unacceptable until the measurement from the noise strength determination system 111 yields a value that is in excess of the value caused by the less-predominant type of modulation.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

In short, the scope of protection is limited solely by the claims that now follow. That scope is intended to be as broad as is reasonably consistent with the language that is used in the claims and to encompass all structural and functional equivalents. Nothing that has been stated or illustrated is intended to cause a dedication of any component, step, feature, object, benefit, advantage, or equivalent to the public, regardless of whether it is recited in the claims.

The phrase "means for" when used in a claim embraces the corresponding structure and materials that have been described and their equivalents. Similarly, the phrase "step for" when used in a claim embraces the corresponding acts that have been described and their equivalents. The absence of these phrases means that the claim is not limited to any corresponding structures, materials, or acts.

I claim:

1. An Second Audio Programming (SAP) signal quality estimation and control system for controlling an SAP signal having noise, the system comprising:
  a signal quality estimation system having an input configured to receive the SAP signal and an output configured to output a quality signal indicative of the quality of the received signal, wherein the signal quality estimation system includes,
    a signal strength determination system having an input configured to receive the SAP signal and an output configured to output a SAP strength signal indicative of the strength of the SAP signal, wherein the signal strength determination system includes (i) an envelope extraction system having an input configured to receive the SAP signal and an output configured to output a SAP magnitude signal indicative of the magnitude of the envelope of the SAP signal, and (ii) an averaging system having an input configured to receive the SAP magnitude signal from the envelope extraction system and an output configured to output an average SAP signal indicative of an average of the SAP magnitude signal;
    a noise strength determination system having an input configured to receive the SAP signal and an output configured to output a SAP noise strength signal indicative of the strength of the noise in the SAP signal, the noise strength determination system including a subtracting system having an input configured to receive the SAP magnitude signal from the envelope extraction system, an input configured to receive the average SAP signal from the averaging system, and an output configured to output a difference signal indicative of the difference between the SAP magnitude signal and the average SAP signal from the averaging system, and wherein the noise strength determination system is configured to receive the difference signal from the output of the subtracting system;
    a signal quality evaluation system having an input configured to receive the SAP strength signal from the output of the signal strength determination system, an input configured to receive the SAP noise strength signal from the noise strength determination system, and an output configured to output a SAP quality signal indicative of the quality of the SAP signal based on the SAP strength signal from the signal strength determination system and the SAP noise strength signal from the noise strength determination system; and
  a signal control system having an input configured to receive the quality signal from the signal quality estimation system and to provide a switching function relating to the SAP signal.

2. The SAP signal quality estimation and control system of claim 1 wherein the signal control system is configured to control switching between an SAP channel and stereo channels.

3. The SAP signal quality estimation and control system of claim 1 wherein the signal control system is configured to control switching between an SAP channel and a monaural channel.

4. The SAP signal quality estimation and control system of claim 1 wherein the signal control system is configured to control switching between enabling and disabling selection of an SAP channel by a user.

5. The SAP signal quality estimation and control system of claim 1 wherein the signal control system is configured to control switching between playing and muting an SAP channel.

6. The SAP signal quality estimation and control system of claim 1 wherein the signal quality estimation system is implemented with a digital signal processing system.

7. A signal quality estimation and control system for controlling a signal having noise, the system comprising:
  a signal strength determination system having an input configured to receive the signal and an output configured to output a signal strength signal indicative of the strength of the signal, wherein the signal strength determination system includes (i) an envelope extraction system having an input configured to receive an FM signal and an output configured to output a FM magnitude signal indicative of the magnitude of the envelope of the FM signal, and (ii) an averaging system having an input configured to receive the FM magnitude signal from the envelope extraction system and an output configured to output an average FM signal indicative of an average of the FM magnitude signal from the envelope extraction system;

a noise strength determination system having an input configured to receive the signal and an output configured to output noise strength signal indicative of the strength of the noise in the signal, wherein the noise strength determination system comprises a subtracting system having a first input configured to receive the FM magnitude signal, a second input configured to receive the average FM signal, and an output configured to output a difference signal indicative of the difference between the FM magnitude signal and the average FM signal, and wherein the noise strength determination system is configured to receive the difference signal from the output of the subtracting system;

a signal quality evaluation system having a first input configured to receive the signal strength signal from the output of the signal strength determination system, a second input configured to receive the noise strength signal from the noise strength determination system, and an output configured to output a quality signal indicative of the quality of the signal based on the signal strength signal and the noise strength signal; and a signal control system having an input configured to receive the quality signal and to control a switching function relating to the signal based on the quality signal;

wherein the input to the signal strength determination system and the input to the noise strength determination system are configured to receive a SAP signal; and wherein the signal control system is configured to control a switching function relating to the SAP signal.

8. The signal quality estimation and control system of claim 7 wherein the output of the signal quality evaluation system is configured to output information indicative of whether the signal quality is acceptable or not acceptable.

9. The signal quality estimation and control system of claim 8 wherein the output of the signal quality evaluation system is based on a comparison between the signal strength signal and a predetermined signal strength threshold.

10. The signal quality estimation and control system of claim 8 wherein the output of the signal quality evaluation system is based on a comparison between the noise strength signal and a predetermined noise strength maximum.

11. The signal quality estimation and control system of claim 8 wherein the output of the signal quality evaluation system is based on a comparison between the signal strength signal and the noise strength signal.

12. The signal quality estimation and control system of claim 11 wherein the comparison is between a ratio of the signal strength signal to the noise strength signal and a predetermined signal-to-noise ratio threshold.

13. The signal quality estimation and control system of claim 12 wherein the quality signal is also based on a comparison between the signal strength signal and a predetermined signal strength.

14. The signal quality estimation and control system of claim 7 wherein the averaging system includes an integrator.

15. The signal quality estimation and control system of claim 7 wherein the signal strength determination system and the noise strength determination system are each implemented with a digital signal processing system.

* * * * *